(12) United States Patent
Lin et al.

(10) Patent No.: US 8,013,983 B2
(45) Date of Patent: Sep. 6, 2011

(54) THREE-DIMENSIONAL SURROUND SCANNING DEVICE AND METHOD THEREOF

(75) Inventors: Tzung-Han Lin, Erlun Township, Yunlin County (TW); Chia-Chen Chen, Hsinchu (TW); Po-Hung Wang, Fongshan (TW); Shih-Pin Chao, Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 400 days.

(21) Appl. No.: 12/210,301

(22) Filed: Sep. 15, 2008

(65) Prior Publication Data
US 2009/0168045 A1 Jul. 2, 2009

(30) Foreign Application Priority Data
Dec. 28, 2007 (TW) ................................ 96150983 A

(51) Int. Cl.
*G01C 3/08* (2006.01)
(52) U.S. Cl. ..................................................... 356/5.11
(58) Field of Classification Search ......... 356/3.01–28.5
See application file for complete search history.

(56) References Cited

U.S. PATENT DOCUMENTS

| 4,294,544 A | 10/1981 | Altschuler et al. |
| 4,594,508 A | 6/1986 | Runciman et al. |
| 5,828,913 A | 10/1998 | Zanen |
| 2006/0193521 A1* | 8/2006 | England et al. ............... 382/190 |

* cited by examiner

*Primary Examiner* — Thomas Tarcza
*Assistant Examiner* — Luke D Ratcliffe
(74) *Attorney, Agent, or Firm* — Rabin & Berdo, P.C.

(57) ABSTRACT

A three-dimensional surround scanning device and a method thereof are described, which are adopted to perform surround scanning on a scene area, so as to construct a three-dimensional model. The device includes an image acquisition element, a first moving mechanism, a range acquisition element, and a controller. The controller controls the image acquisition element, the range acquisition element, and the first moving mechanism to perform three-dimensional image acquisition, so as to obtain a two-dimensional image covering the scene area, depth information with three-dimensional coordinates, and corresponding position signals. The controller rearranges and combines the two-dimensional image, position signals, and depth information, so as to construct the three-dimensional model.

16 Claims, 17 Drawing Sheets

THREE-DIMENSIONAL SURROUND SCANNING DEVICE AND METHOD THEREOF

CROSS-REFERENCE TO RELATED APPLICATIONS

This non-provisional application claims priority under 35 U.S.C. §119(a) on Patent Application No(s). 096150983 filed in Taiwan, R.O.C. on Dec. 28, 2007, the entire contents of which are hereby incorporated by reference.

BACKGROUND OF THE INVENTION

1. Field of the Invention

The present inventions relates to a three-dimensional surround scanning device and method thereof, and in particular, to a device and a method for constructing a three-dimensional surround image by combining an image acquisition device and a range measurement device.

2. Related Art

A three-dimensional surround scanning process mainly includes three procedures, namely in sequence, range measurement, image acquisition, and calibration. The range measurement and image acquisition may be performed synchronously, so as to increase the efficiency of the three-dimensional surround scanning process. Each procedure may be respectively achieved through several developing or mature techniques, in which the range measurement is achieved through the following techniques, including sonar, radar, light detection and ranging (LiDAR), laser scanner, computer vision, and the like. The image acquisition techniques include panorama, mapping, registration, and the like. The calibration techniques are divided into color calibration, synchronization calibration, and geometric calibration.

The aforementioned range measurement techniques can be obtained in U.S. Pat. No. 4,294,544, entitled "Topographic Comparator", which is a comparator for topographic measurement. Particularly, an array laser scanner is used together with a camera (a programmable electro-optic shutter) to reconstruct the three-dimensional position information of an object.

U.S. Pat. No. 4,594,508, entitled "Radiation Scanning Systems", discloses a radial scanning system, which also belongs to one of the range measurement techniques. The system combines a radiation instrument with a refractor rotating along a single axis, so as to calculate the three-dimensional position information between a reflected radiation path and an object.

U.S. Pat. No. 5,828,913, entitled "Method for Three Dimensional Measurement and Imaging having Focus-related Convergence Compensation", discloses a three-dimensional measurement and imaging method, which utilizes the technique of computer vision, and particularly a camera is used together with two reflecting mirrors disposed at different angles, so as to perform a three-dimensional image acquisition on the same object. With the camera being fixed, the two reflecting mirrors are used to perform the image acquisition on the object, so as to obtain images of the object in different angles. Camera calibration parameters and overlapped portions of the two image pictures are then used to reconstruct a three-dimensional model of the object.

Each three-dimensional surround scanning technology aims at raising the processing speed, increasing the accuracy, reducing the cost, increasing the operation or erection convenience, and achieving a novel measurement algorithm. Therefore, how to achieve the above various functions has become a task for the research staff.

SUMMARY OF THE INVENTION

The present invention is directed to a three-dimensional surround scanning device and a method thereof, in which a three-dimensional model data of a scene area may be obtained by combining an image acquisition element, a range acquisition element, and a moving mechanism, together with proper software computations.

The present invention provides a three-dimensional surround scanning device, which is used to perform a three-dimensional surround scanning on a scene area, so as to construct a three-dimensional model data. The scene area is defined by a first length and a second length. The three-dimensional surround scanning device includes: an image acquisition element, for shooting and returning a two-dimensional image when being actuated; a first moving mechanism, for carrying the image acquisition element, and when being actuated, for making the image acquisition element perform a scanning motion along a direction of the first length, and returning at least one position signal corresponding to the scanning position; a range acquisition element, disposed on the first moving mechanism, and when being actuated, for performing back and forth scanning along a direction of the second length, and returning at least one depth information, in which when the first moving mechanism and the range acquisition element are both actuated, the range acquisition element performs the back and forth movement along the direction of the first length corresponding to a direction of the second length and returns the depth information with three-dimensional coordinates; and a controller, for actuating the image acquisition element, the first moving mechanism, and the range acquisition element, to control the image acquisition element, the first moving mechanism, and range acquisition element to respectively return at least one two-dimensional image, the position signals, and the depth information covering the scene area, in which the controller reads the two-dimensional image and the depth information, and converts them into the three-dimensional model data.

The present invention provides a three-dimensional surround scanning method, which is used to perform a three-dimensional surround scanning on a scene area, for constructing a three-dimensional model data. The scene area is defined by a first length and a second length. The three-dimensional surround scanning method includes the following steps: acquiring at least one two-dimensional image along a direction of the first length and reading position signals corresponding to the two-dimensional image; performing a back and forth scanning motion along the direction of the first length corresponding to a direction of the second length and reading at least one depth information with three-dimensional coordinates corresponding to the back and forth scanning motion; rearranging the two-dimensional image, the position signals, and the depth information; and combining the rearranged two-dimensional image, position signals, and depth information, to produce the three-dimensional model data.

Through the device and method of the present invention, a surround scanning is performed on a scene area to produce a three-dimensional model data. The three-dimensional model data may be, but not limited to, a point clouds data, a three-dimensional point clouds data with color information, a three-dimensional model data with a triangular grid, or a three-dimensional model data with a triangular grid color sub-image.

BRIEF DESCRIPTION OF THE DRAWINGS

The present invention will become more fully understood from the detailed description given herein below for illustration only, which thus is not limitative of the present invention, and wherein.

DETAILED DESCRIPTION OF THE INVENTION

[Three-Dimensional Surround Scanning Device]

Figure 1:
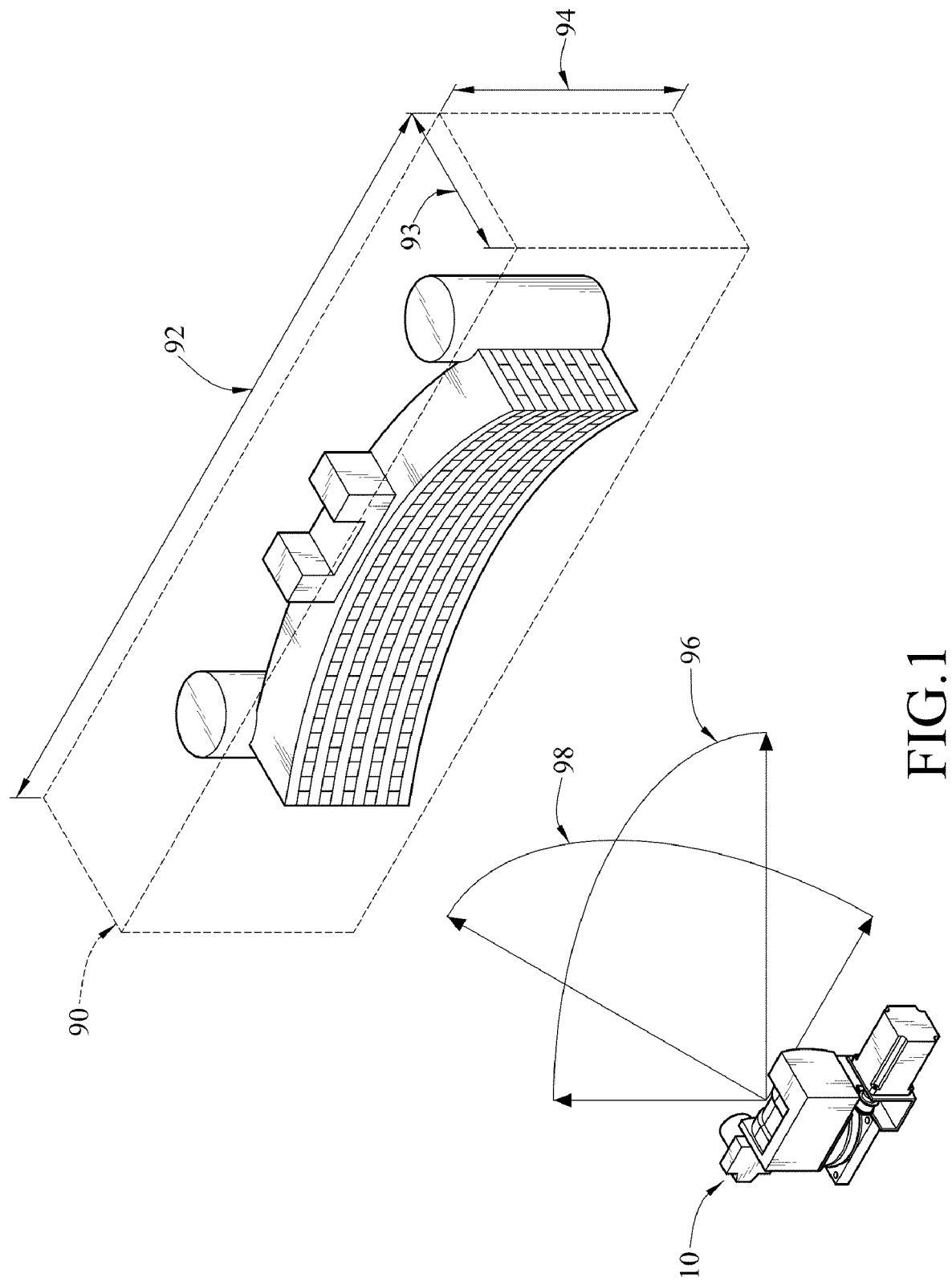
FIG. 1 is a schematic view of the operation of a three-dimensional surround scanning device of the present invention.

Referring to FIG. 1, it is a schematic view of a three-dimensional surround scanning device of the present invention. It can be seen from FIG. 1 that, a three-dimensional surround scanning device 10 is used to perform a three-dimensional surround scanning on a scene area 90, so as to construct a three-dimensional model data. The scene area 90 is defined by a first length 92 and a second length 94. A direction of the first length 92 refers to a long axis direction of the first length 92, i.e., the direction for measuring the first length 92. As for FIG. 1, the first length 92 is a width of the scene area, and the direction of the first length 92 is a horizontal direction (referred as to a first axial direction hereinafter). The second length 94 is a height, and the direction of the second length 94 is a vertical direction (referred to as a second axial direction hereinafter), i.e., the free-fall direction. Although the present invention is illustrated with the first axial direction and the second axial direction corresponding to the width and the height respectively, it is not limited thereby. When the present invention is applied, the first length 92 of this embodiment may be set as the length of the scene area 90 (i.e., a third length 93), and the second length 94 may be set as the width of the scene area 90 (i.e., corresponding to the reference numeral 92). In such a way, the scanning is performed in a manner of toping viewing the scene area 90, and so forth.

The three-dimensional surround scanning device 10 may perform scanning along the direction of the first length 92 through a structure design thereof, i.e., in a scanning manner indicated as 96. The three-dimensional surround scanning device 10 may also perform scanning along the direction of the second length 94, i.e., in a scanning manner indicated as 98.

Figure 2:
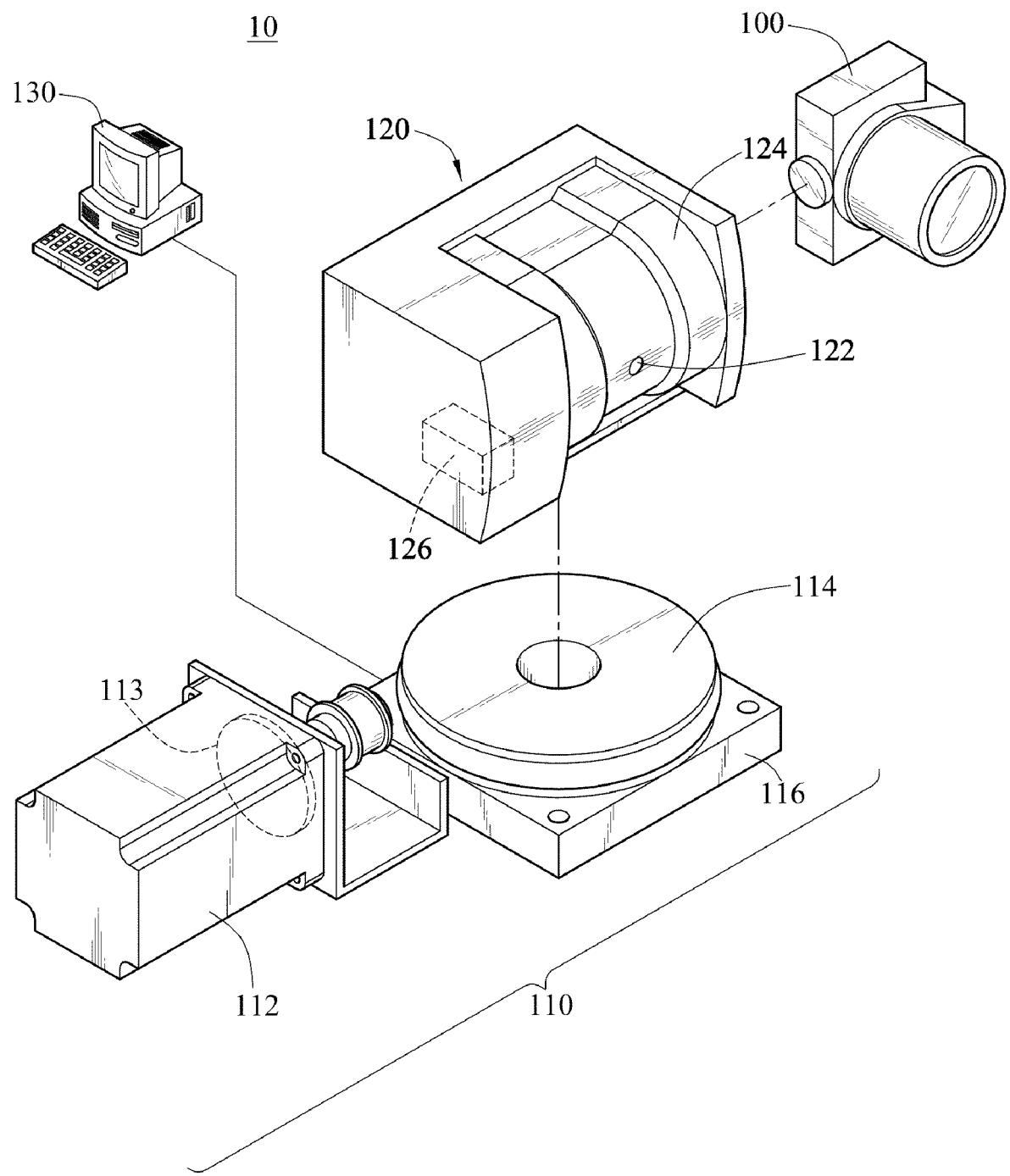
FIG. 2 is an exploded view of a structure of a three-dimensional surround scanning device of the present invention.

Referring to FIG. 2, the structure of the three-dimensional surround scanning device 10 may be obtained. It can be seen from FIG. 2 that, the three-dimensional surround scanning device 10 includes an image acquisition element 100, a first moving mechanism 110, a range acquisition element 120, and a controller 130. The image acquisition element 100, the first moving mechanism 110, and the range acquisition element 120 are all actuated by the controller 130, to perform the aforementioned scanning operation.

The first moving mechanism 110 carries the image acquisition element 100, makes the image acquisition element 100 perform a scanning motion along the direction of the first length 92 (i.e., the first axial direction) when being actuated, and returns at least one position signal (or a plurality of position signals) corresponding to the scanning position to the controller 130.

The first moving mechanism 110 includes a servo motor 112, a position encoder 113, a carrying plate 114, and a deceleration gear train 116. The servo motor 112 produces a rotation motion upon being actuated. The position encoder 113 is disposed corresponding to the servo motor 112, and returns the position signals corresponding to the rotation motion. The carrying plate 114 carries the image acquisition element 100 and the range acquisition element 120. The deceleration gear train 116 is connected to the carrying plate 114, and receives the rotation motion to make the carrying plate 114 produce the scanning motion.

Figure 3:
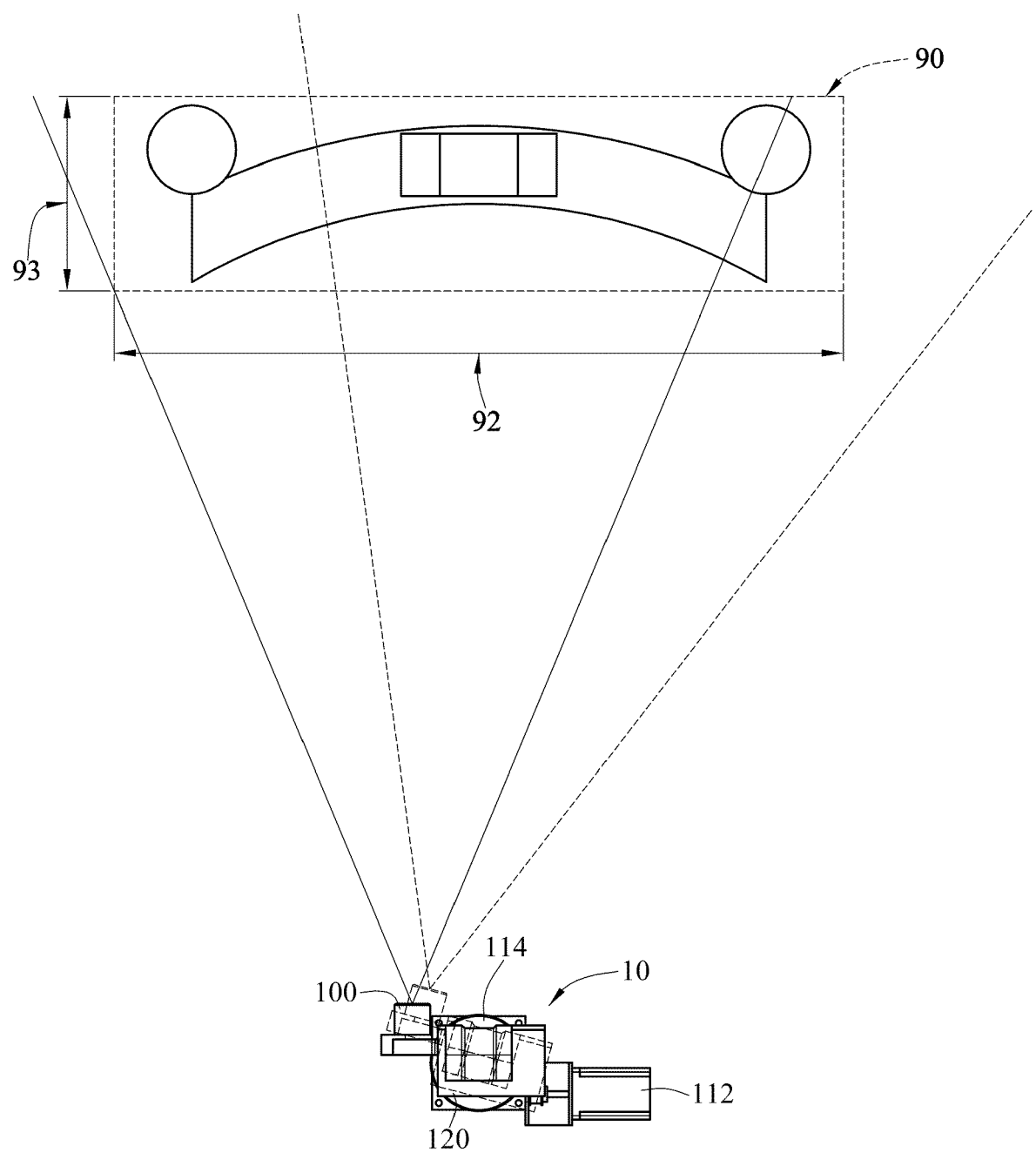
FIG. 3 is a schematic view of motions of an image acquisition element and a first moving mechanism of the present invention.

It can be seen from FIG. 2 that, the deceleration gear train 116 receives the rotation motion and makes the carrying plate 114 perform a rotation scanning motion along the first axial direction. Referring to FIG. 3, it is a schematic view of motions of the image acquisition element 100 and the first moving mechanism 110. It can be seen from FIG. 3 that, the first moving mechanism 110 drives the image acquisition element 100 to make an arc-shaped movement (a circular arc-shaped movement), such that the image acquisition element 100 may shoot and return two-dimensional images of the scene area 90 from different covering perspectives (covering angles). Taking FIG. 3 for example, the controller 130 controls the first moving mechanism 110 to drive and to control the image acquisition element 100 to acquire a two-dimensional image at a right side of the scene area 90 (a region covered by dashed lines in FIG. 3), and when the first moving mechanism 110 moves the image acquisition element 100 to reach the position marked by solid lines, the controller 130 controls the image acquisition element 100 to acquire a second two-dimensional image, such that the second two-dimensional image covers an image at a left side of the scene area 90. Therefore, a complete two-dimensional image may be obtained by combining the two two-dimensional images.

The position encoder 113 returns an angle position of the servo motor 112. After the data collection is decelerated by the deceleration gear 116, an image acquisition position of the image acquisition element 100 may be obtained. Before determining the aforementioned angle position, when the whole system is started, a return-to-zero operation should be performed to the servo motor 112 and the deceleration gear 116, so as to obtain an original starting position, and thus ensuring that the shooting position calculated by the controller 130 is consistent with the actual shooting position.

Although the first moving mechanism 110 of the present invention has already been illustrated with the above embodiment as an example, besides the above manner, it may be further implemented as a moving mechanism capable of producing ellipse arc-shaped movement. Of course, a link mechanism may also be employed together with the servo motor to produce linear movement for performing scanning, but when returning the position signals, the calculation manner of the controller 130 should be altered accordingly, so as to obtain a correct shooting position.

Next, the image acquisition element 100 shoots and returns a two-dimensional image when being actuated by the controller 130. Therefore, through combining the image acquisition element 100 with the first moving mechanism 110, the image acquisition element 100 shoots towards the scene area 90 and returns at least one two-dimensional image data to the controller 130. The two-dimensional image data covers the range of the first length 92 and the second length 94 of the scene area 90. If the two-dimensional image obtained by the image acquisition element 100 through a single shooting covers the scene area 90, only one two-dimensional image needs to be shot. If the two-dimensional image obtained by the image acquisition element 100 through a single shooting cannot cover the scene area 90, the first moving mechanism 110 is used to drive the image acquisition element 100 to perform a scanning along the direction of the first length 92, to obtain at least one two-dimensional image (or a plurality of two-dimensional images), so as to fully cover the scene area 90. The number of the shot two-dimensional images may be increased or decreased as required. Even if a single two-dimensional image can cover the whole scene area 90, more than one two-dimensional image may be shot.

Next, the returned two-dimensional image corresponds to the position information. That is to say, during the shooting process of the image acquisition element 100, the first moving mechanism 110 returns a current position of the first moving mechanism 110, and accordingly, the controller 130 may calculate an angle and a position for shooting the two-dimensional image, and meanwhile, may calculate the area covered by the two-dimensional image.

The two-dimensional image returned by the image acquisition element 100 may be in a gray scale format, or in a color mode, depending upon the selected image acquisition element 100. The image acquisition element 100 adapted for the present invention may be, for example, a digital camera, a digital video camera, a digital charged couple device (CCD), or an analog-to-digital image device, but it is not limited to that.

Furthermore, in this embodiment, the moving mechanism 110 drives the image acquisition element 100 to move along the first axial direction, which facilitates the image acquisition element 100 to perform scanning, and shoot and return an appropriate number of two-dimensional images. Since the image acquisition element 100 is driven to perform scanning along the first axial direction, an imaging height of the two-dimensional image returned by the image acquisition element 100 must cover the second length of the scene area 90 (the total height). If the imaging height of the two-dimensional image is smaller than the second length of the scene area 90, the image acquisition element 100 may be considered to be equipped with a wide-angle lens, to cover the second length of the scene area 90, or the first moving mechanism 110 may be replaced, i.e., replaced by a mechanism capable of scanning along the direction of the first length 92 (the first axial direction) with a different elevation angle. That is, the adopted mechanism may perform scanning along the first axial direction at an elevation angle of 0 degrees, 15 degrees, 30 degrees, and so on. In such a way, a complete two-dimensional image data may be integrated through calculations of the controller 130.

The range acquisition element 120 is disposed on the first moving mechanism 110, and driven by the first moving mechanism 110 to perform scanning along the direction of the first length 92. Upon being actuated, the range acquisition element 120 may perform back and forth scanning along the direction of the second length 94 and return at least one depth information. Therefore, when the first moving mechanism 110 and the range acquisition element 120 are both actuated, the range acquisition element 120 may perform the back and forth movement along the direction of the first length 92 corresponding to the direction of the second length 94, and return the depth information with three-dimensional coordinates.

Figure 4A:
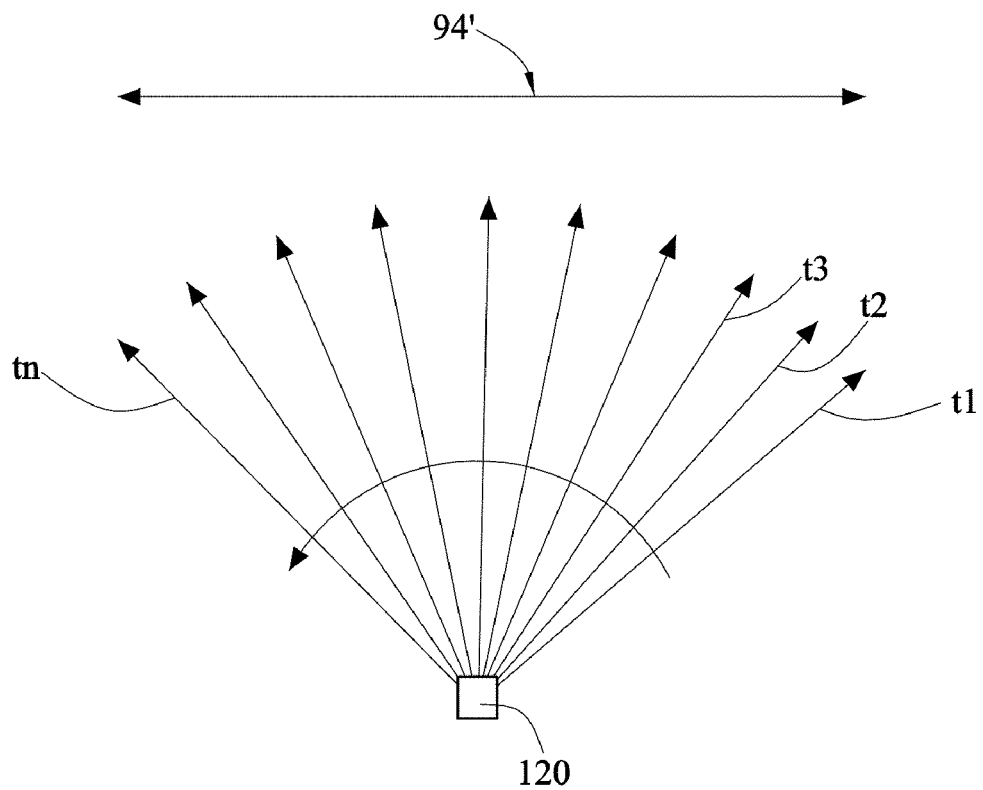
FIG. 4A is a schematic view of motions of a range acquisition element of the present invention.
Figure 4B:
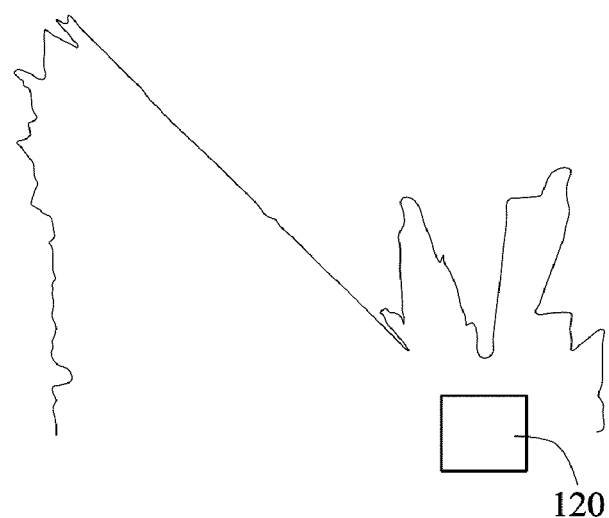
FIG. 4B shows a profile diagram of depth information returned from the range acquisition element of the present invention after being operated for a cycle.

Referring to FIGS. 4A and 4B, FIG. 4A is a schematic view of motions of the range acquisition element 120, in which the numeral 94' indicates the direction of the second length 94. It can be seen from FIG. 4A that, the range acquisition element 120 sequentially sends laser pulses $t_1, t_2, t_3 \ldots t_n$ along the direction of the second length 94, to scan the whole range of the second length 94. Therefore, once the range acquisition element 120 receives (reads) the reflected laser pulses, it converts them into depth information, as shown in FIG. 4B, it shows a profile diagram of depth information returned from the range acquisition element 120 after being operated for a cycle.

Referring to FIG. 2 again, the range acquisition element 120 includes a laser range measurement element 122, a second moving mechanism 124, and a control unit 126. The laser range measurement element 122 emits a laser pulse, and reads and coverts a reflected laser pulse into depth information. The second moving mechanism 124 carries the laser range measurement element 122, and makes the laser range measurement element 122 perform back and forth scanning along the direction of the second length 94 when being actuated, so as to return the depth information and at least one back and forth scanning position (or a plurality of back and forth scanning positions) corresponding to the depth information. Upon being actuated by the controller 130, the control unit 126 actuates the laser range measurement element 122 and the second moving mechanism 124, and integrates the depth information with the back and forth scanning positions, so as to return the depth information with three-dimensional coordinates.

The conversion of the depth information with three-dimensional coordinates is illustrated as follows.

Figure 5A:
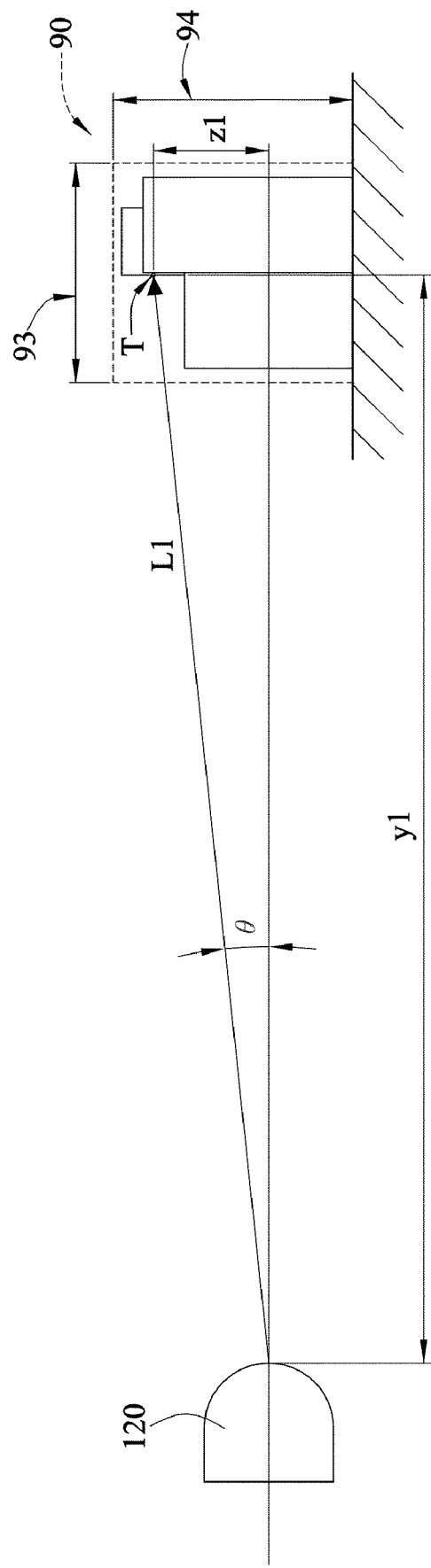
FIGS. 5A and 5B are schematic views for calculating the depth information with three-dimensional coordinates returned from the range acquisition element.
Figure 5B:
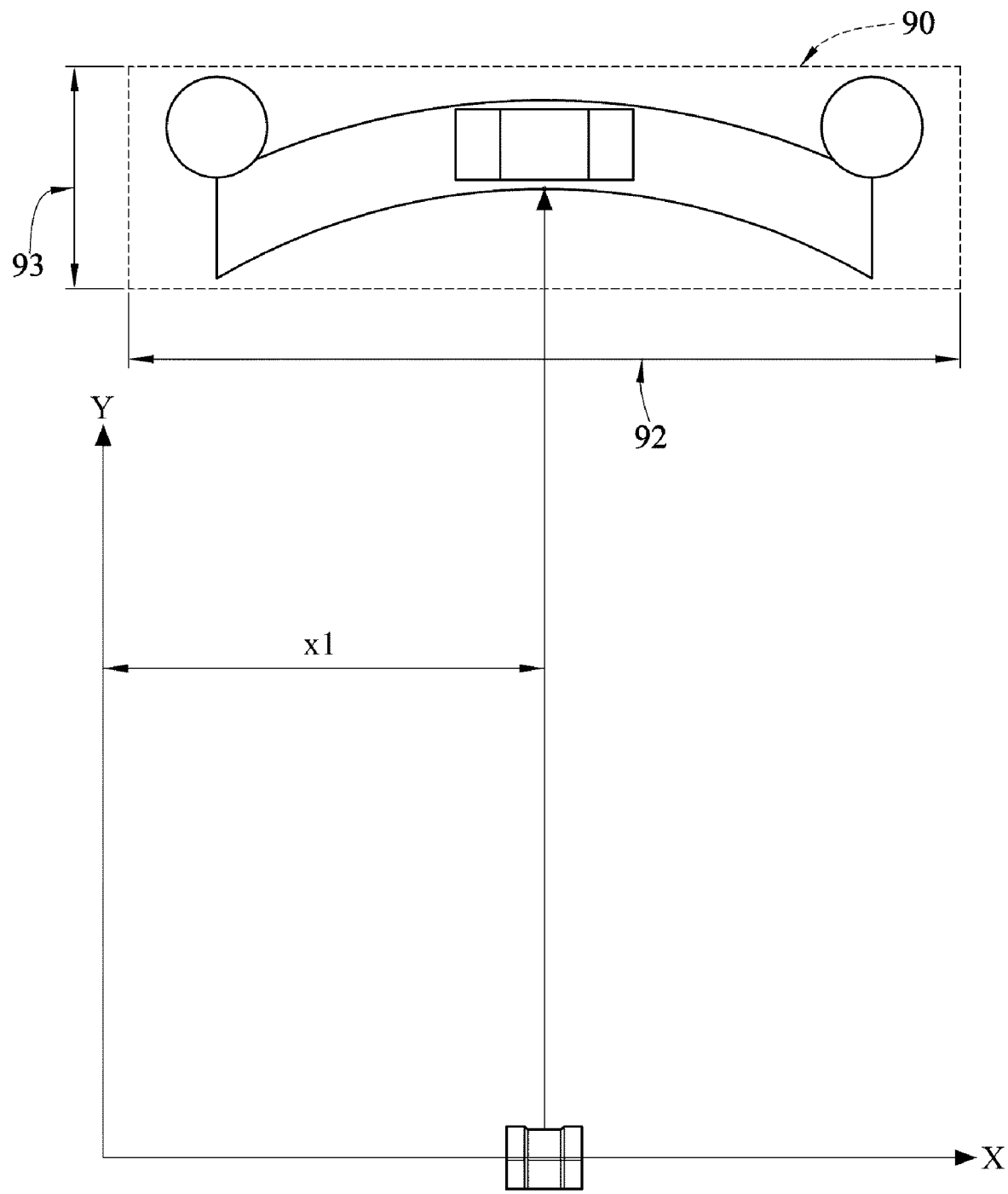

Referring to FIGS. 5A and 5B, FIG. 5A is a schematic sectional view of the scene area 90 along the direction of the second length 94. It can be seen from FIG. 5A that, the range acquisition element 120 performs back and forth scanning along the direction of the second length 94. Therefore, it is assumed that the depth information read at a scanned point T is L1, and an elevation angle of the laser range measurement element 122 is θ, such that a horizontal depth value y1 at the point T is L1 cos θ, and a vertical height z1 at the point T is L1 sin θ. Referring to FIG. 5B, it is a schematic sectional view of the scene area 90 along the direction of the first length 92, and a width position x1 thereof can be obtained directly from the figure. In this way, the aforementioned depth information with three-dimensional coordinates may be returned. If the depth information returned by the laser range measurement element 122 is a straight line in space, and respectively has an angle at all the three axial directions, the three-dimensional coordinates of the measured point may be obtained through trigonometric functions.

Although the range acquisition element 120 has been illustrated with the above embodiments as an example, other range acquisition elements 120 capable of returning the depth information with three-dimensional coordinates may also be applied in the present invention, for example, the aforementioned second moving mechanism 124 may be used to directly drive the reflecting mirror mechanism (not shown) within the laser range measurement element 122, such that the reflecting mirror mechanism may produce a back and forth scanning motion, so as to achieve the same effect.

Furthermore, upon being actuated, the range acquisition element 120 performs back and forth scanning through being associated with the second moving mechanism. Therefore, the range acquisition element 120 may return depth information in the whole back and forth travel, and may return the depth information merely in the forth travel, but stop the sending and reading motions in the back travel, depending upon the user's design. Moreover, the scanning motion performed by the range acquisition element 120 may also be a rotation motion, and the motions of reading and returning depth information may be set to be performed merely when scanning in the range of the scene area 90. In the region outside the scene area 90, the range acquisition element 120 may make movements at a higher speed, so as to reduce an operation time.

The range acquisition element 120 may be, but not limited to, imaging devices of light detection and ranging (LiDAR), or LMS series systems (such as LMS-291) available from the SICK Company.

In FIG. 2, the image acquisition element 100 is fixed on the range acquisition element 120, and the range acquisition element 120 is fixed on the first moving mechanism 110. Therefore, the image acquisition element 100 and the range acquisition element 120 are driven by the first moving mechanism 110 to move along the direction of the first length 92. Although the image acquisition element 100 is fixed to the first moving mechanism 110 via the range acquisition element 120, the image acquisition element 100 is not driven by the range acquisition element 120 to move back and forth along the direction of the second length 94, which is illustrated herein.

Figure 6:
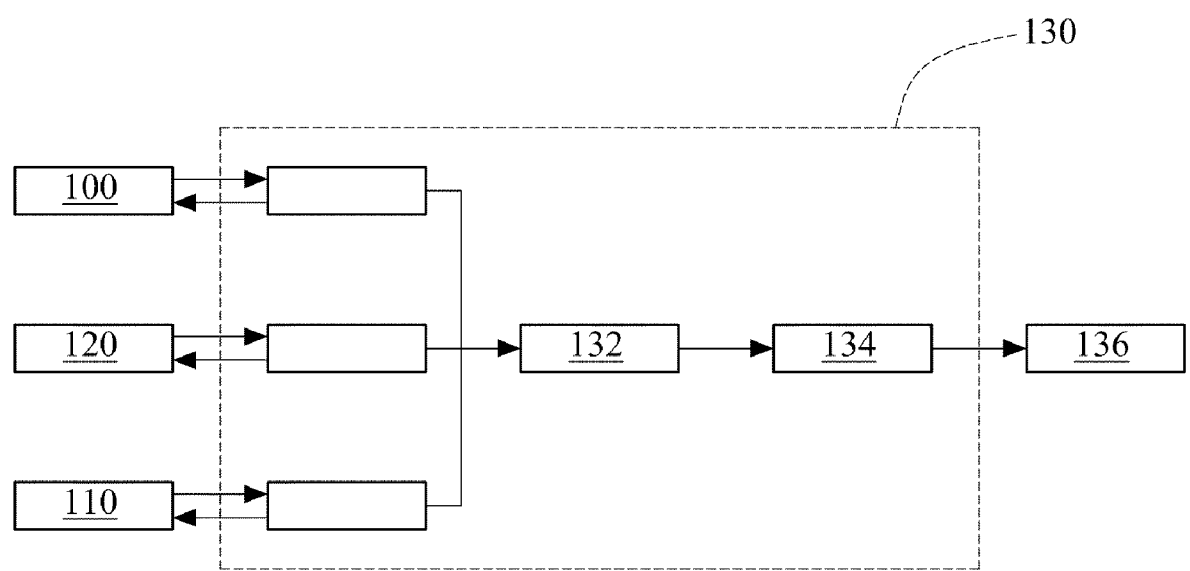
FIG. 6 is a circuit block diagram of a whole three-dimensional surround scanning device of the present invention.

The controller 130 may be, but not limited to, a microprocessor, a computer, or a server, and the operation manner thereof may be obtained with reference to FIG. 6, it is a circuit block diagram of a whole three-dimensional surround scanning device 10 of the present invention. It can be seen from FIG. 6 that, the controller 130 is connected to and controls the image acquisition element 100, the range acquisition element 120, and the first moving mechanism 110. The controller 130 generates three sets of threads, for respectively sending an initialization instruction to the image acquisition element 100, the range acquisition element 120, and the first moving mechanism 110, to make them perform an initialization operation. After the image acquisition element 100, the range acquisition element 120, and the first moving mechanism 110 finish the initialization operation, the controller 130 controls the image acquisition element 100, the range acquisition element 120, and the first moving mechanism 110 to perform the scanning operations on the scene area 90 respectively, and receives the two-dimensional image, position signals, and depth information with three-dimensional coordinates from the image acquisition element 100, the range acquisition element 120, and the first moving mechanism 110, and then performs data synchronization 132 and data rearrangement 134, so as to output a three-dimensional model data 136.

Figure 7A:
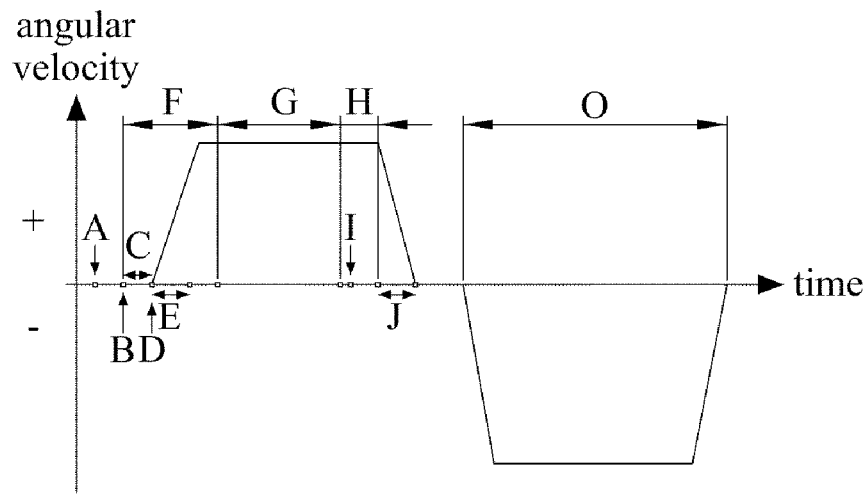
FIGS. 7A, 7B, and 7C are control timing diagrams of a controller of the present invention.
Figure 7B:
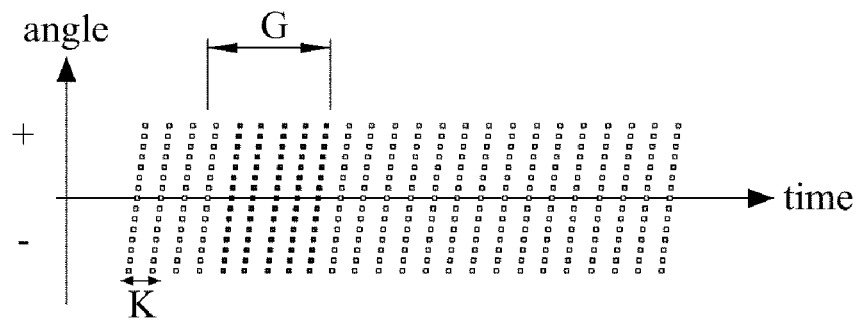
Figure 7C:
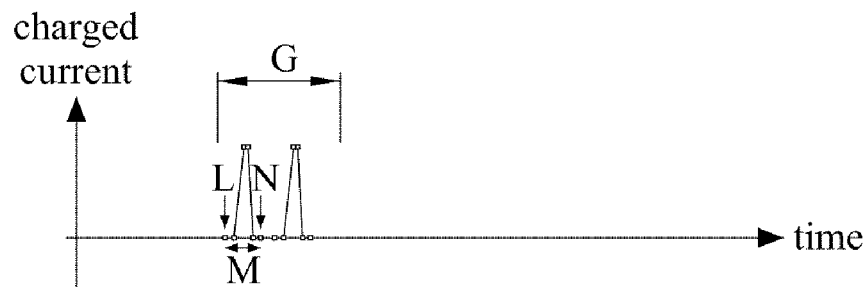

Referring to FIGS. 7A, 7B, and 7C, they are control timing diagrams of the controller 130. FIG. 7A is a control timing diagram of the controller 130 for controlling the servo motor 112 of the first moving mechanism 110. As shown in FIG. 7A, the horizontal axis indicates the time, and the vertical axis indicates the angular velocity. It can be seen from FIG. 7A that, the controller 130 controls the servo motor 112 to perform movements with a constant angular velocity. Each time point and each time section are illustrated as follows.

Point A indicates a time point when the controller issues an initialization instruction to the servo motor 112, the image acquisition element 100, and the range acquisition element 120;

Point B indicates a time point when the controller 130 sends a control instruction to the servo motor 112.

Section C indicates a time interval spent for the controller 130 to send the instruction to the servo motor 112.

Time point D indicates a time point when the servo motor 112 begins to rotate after receiving the instruction.

Time section E indicates a time interval spent for the servo motor to accelerate to maintain a steady angular velocity from the static state.

Time section F indicates a time interval from the controller 130 sending the instruction to the image acquisition element 100 or the range acquisition element 120 to beginning to acquire the two-dimensional image, position signals, and depth information with three-dimensional coordinates.

Time section G indicates a time interval actually spent for the whole three-dimensional surround scanning device 10 of the present invention to scan the scene area 90.

Time point I indicates a time point when the controller 130 issues a stop instruction to the servo motor 112.

Time section H indicates a time interval for the servo motor 112 from receiving the stop instruction from the controller 130 to beginning to decelerate.

Time section J indicates a time interval for the servo motor 112 from beginning to decelerate to being stopped.

Once the servo motor 112 has finished the above motions, the controller 130 issues a return instruction to the servo motor 112, to make it perform a recovery motion for a time section O to return to the initialized angular position.

It can be known from the above control manner that, the scanning operation of the whole three-dimensional surround scanning device 10 is performed within the time section G. Since the servo motor 112 operates under a constant angular velocity in the time section G, the position of the first moving mechanism 110 may be grasped easily. That is to say, the real-time positions of the image acquisition element 100 and the range acquisition element 120 after being associated and driven by the first moving mechanism 110 may be easily calculated. Furthermore, since the first moving mechanism 110 may return the position signals, it may also be taken as the position being scanned by the image acquisition element 100 and the range acquisition element 120.

Although the present invention performs scanning within the time section G at a constant angular velocity, it is not limited to that. The scanning may also be performed within the time section when the servo motor 112 accelerates or decelerates, but through such a manner, a comparison with the returned position signals shall be made, so as to ensure the synchronization degree among the read two-dimensional image, position signals, and depth information with three-dimensional coordinates.

Next, referring to FIG. 7B, it is a control timing diagram of the range acquisition element 120. It can be seen from FIG. 7B that, after the time point B, the range acquisition element 120 begins to perform back and forth scanning. As shown in FIG. 7B, the horizontal axis also indicates the time, the vertical axis indicates the angle at which the laser range measurement element 122 is controlled to scan along the direction of the second length 94, and K in the figure indicates a time spent for the range acquisition element 120 to perform back and forth scanning. It can be seen from FIG. 7B that, only within the above time section G, the information returned to the controller 130 by the range acquisition element 120 is used by the controller 130 to generate the three-dimensional model data. Furthermore, it can also be seen from FIG. 7B that, the range acquisition element 120 only make a range acquisition in the forth travel, but does not make the range acquisition in the back travel, and the time spent on the back travel is shorter than that spent on the forth travel, so as to accelerate the scanning speed.

Referring to FIG. 7C, it is a timing diagram of the image acquisition element 100 for being controlled. As shown in FIG. 7C, the horizontal axis indicates the time, and the vertical axis indicates the charged current of the image acquisition element 100 before each shooting process. It can be seen from FIG. 7C that, at the time point L, the image acquisition element 100 is actuated by the controller 130 to shoot the two-dimensional image. Time section M indicates a total time spent for the image acquisition element 100 to acquire one two-dimensional image. Time point N indicates a time point when the image acquisition element 100 finishes acquiring the two-dimensional image, stores and returns the image to the controller 130. After the time point N, the image acquisition element 100 may be actuated once again by the controller 130 to acquire the two-dimensional image.

Therefore, as known by combining FIGS. 7A, 7B, and 7C that, during the process of performing one three-dimensional surround scanning operation, one scanning is performed from the time point A to the time point I, and the controller 130 receives at least one two-dimensional image, position signals, and depth information with three-dimensional coordinates, and then performs data synchronization 132 and data rearrangement 134.

Figure 9A:
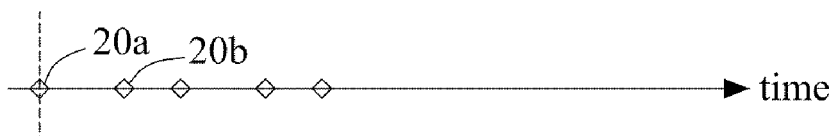
FIGS. 9A, 9B, and 9C are schematic views of data synchronization for the controller of the present invention.
Figure 9B:
Figure 9C:
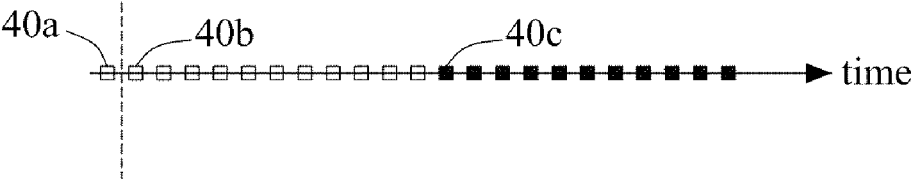

The data synchronization may be obtained with reference to FIGS. 9A, 9B, and 9C, and they are schematic views of the data synchronization 132 for the controller 130 of the present invention. The horizontal axis in FIGS. 9A, 9B, and 9C indicates the time. The horizontal axis in FIG. 9A indicates the time point when the image acquisition element 100 acquires an image. As seen from FIG. 9A that, the image acquisition element 100 acquires two-dimensional images at time points of 20*a*, and 20*b*, etc., and returns the images to the controller 130. The horizontal axis in FIG. 9B indicates the time points when the range acquisition element 120 reads the depth information after each laser pulse is sent, in which the time points 30*a*, 30*b* respectively indicate the time points for reading the first and second depth information, that is, the time points for the positions being measured through the laser pulse. From the time points, the elevation angle of the second moving mechanism 124 may be known. The horizontal axis in FIG. 9C indicates the time points 40*a*, 40*b* when the servo motor 112 (the position encoder 113) returns the position signals. The mark after the time point 40*c* indicates the start time when the servo motor 112 (the position encoder 113) returns to the initial position.

When the scanning is performed within the time section G, it should be noted that, (a) at the beginning of the time section G, the position scanned by the range acquisition element 120 must be a position for right entering the scene area 90 from the exterior of the scene area 90. When the image acquisition element 100 shoots the first two-dimensional image, the region covered by the first two-dimensional image should be larger than or equal to a single edge boundary of the scene area 90. Taking FIG. 7C as an example, it is assumed that the image acquisition element 100 totally acquires two two-dimensional images, then the combination of the two two-dimensional images should be larger than or equal to the first length 92 of the scene area 90, so as to ensure that the image within the scene area 90 has been fully acquired.

Figure 8A:
FIGS. 8A, 8B, and 8C are schematic views of a two-dimensional image acquired by the image acquisition element of the present invention.
Figure 8B:
Figure 8C:

The acquired two-dimensional images may be seen from FIGS. 8A, 8B, and 8C. The two-dimensional images are acquired when performing the three-dimensional surround scanning test of the present invention on a building outdoors. It can be seen from FIG. 8A that, the acquired two-dimensional image is the right side of the building, that is, the right side of the scene area 90. The acquired two-dimensional image in FIG. 8B is the left half part of the building, that is, the middle left side of the scene area 90. The acquired two-dimensional image in FIG. 8C is the left side of the building, that is, the left side of the scene area 90. In such a way, three two-dimensional images may be combined into a two-dimensional image of a complete building (scene area) with color information (the schematic views herein are represented in a gray scale format, and it is not limited to the gray scale, but may also be implemented in a color format). The examples shown in the figures are gray-scale two-dimensional images, but color two-dimensional images may also be employed.

Since the employed image acquisition element 100 utilizes a lens to acquire the vision of the scene area 90 into the image acquisition element 100, there are arc-shaped deformations (stretched or compressed) around the lens (i.e., four boundary positions of the two-dimensional image). Therefore, such deformations should be amended when the two-dimensional image is processed by the controller, so as to obtain a more accurate two-dimensional image.

As seen from FIGS. 9A, 9B, and 9C that, the first acquisition time point 20*a* of the two-dimensional image is consistent with the first scanning time point 30*a* of the depth information, but both of them fall between the time points 40*a*, 40*b* of the position signal. Therefore, in order to obtain the position for acquiring the depth information, the time point at which the time point 30*a* of the depth information is just located between the time points 40*a*, 40*b* of the position signal may be calculated through linear interpolation, so as to get its scanning position, such that the pixel position of the two-dimensional image corresponding to that point may be figured out. In such a way, the data obtained by the whole scanning process may be synchronized.

The above data rearrangement is to integrate the synchronized data, to obtain a three-dimensional model data 136.

The three-dimensional model data 136 includes several different configurations, i.e., different manners of the data rearrangement: a three-dimensional model data of a point clouds data, a three-dimensional point clouds data with color information, a three-dimensional model data of a triangular grid, and a three-dimensional model data with a triangular grid color sub-image (in other words, an image segment of triangular grid color), which are illustrated as follows.

Figure 10A:
FIG. 10A is a schematic view of a three-dimensional model data for a point clouds data accomplished by the three-dimensional surround scanning device of the present invention.

Referring to FIG. 10A, it is a schematic view of a three-dimensional model data of a point clouds data accomplished by the three-dimensional surround scanning device 10. The synchronized depth information with three-dimensional coordinates and position signals are integrated to form a point clouds diagram with a depth, which is an implementing manner of the three-dimensional model data.

Figure 10B:
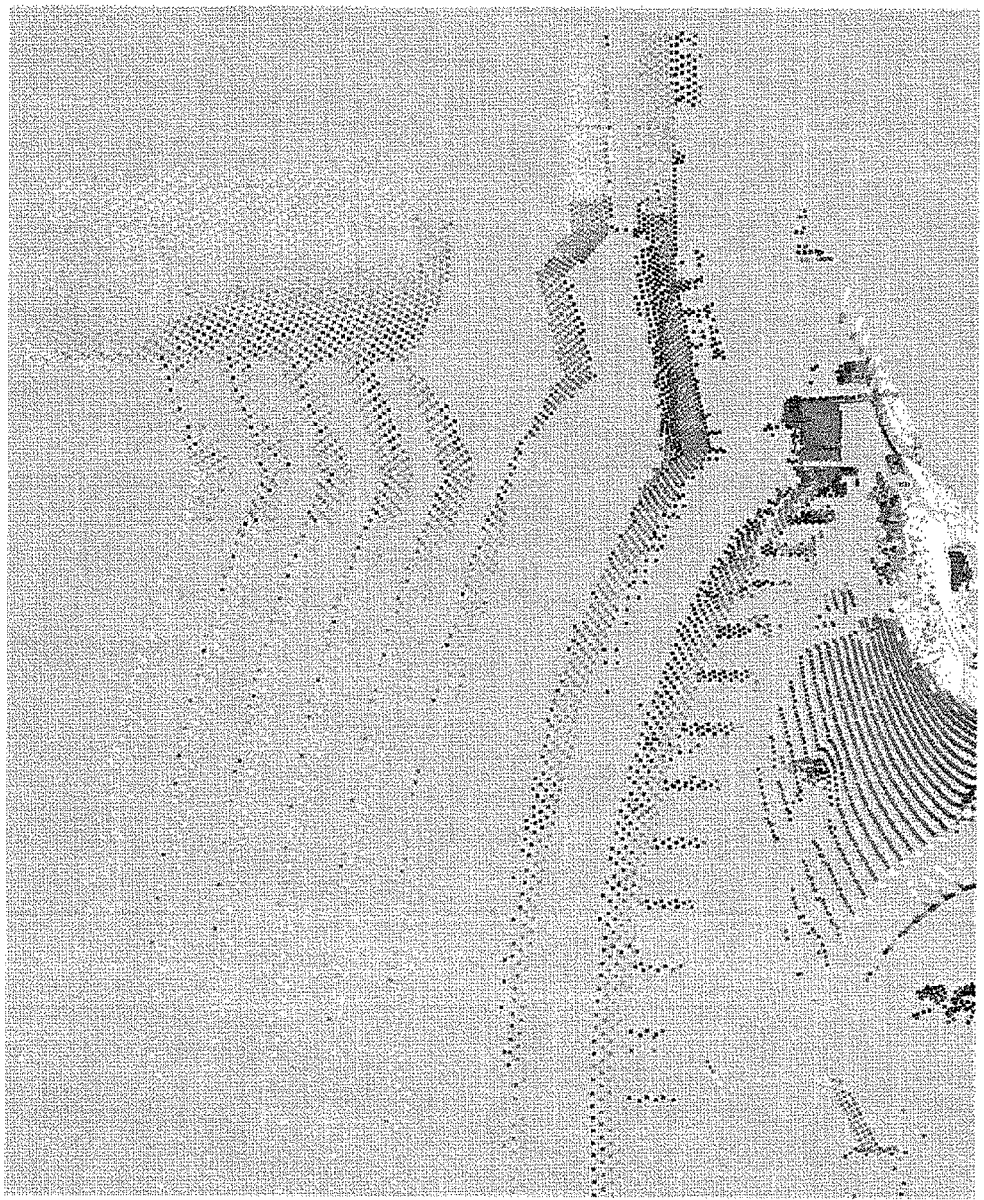
FIG. 10B is a schematic view of a three-dimensional model data with color information accomplished by the three-dimensional surround scanning device of the present invention.
Figure 10C:
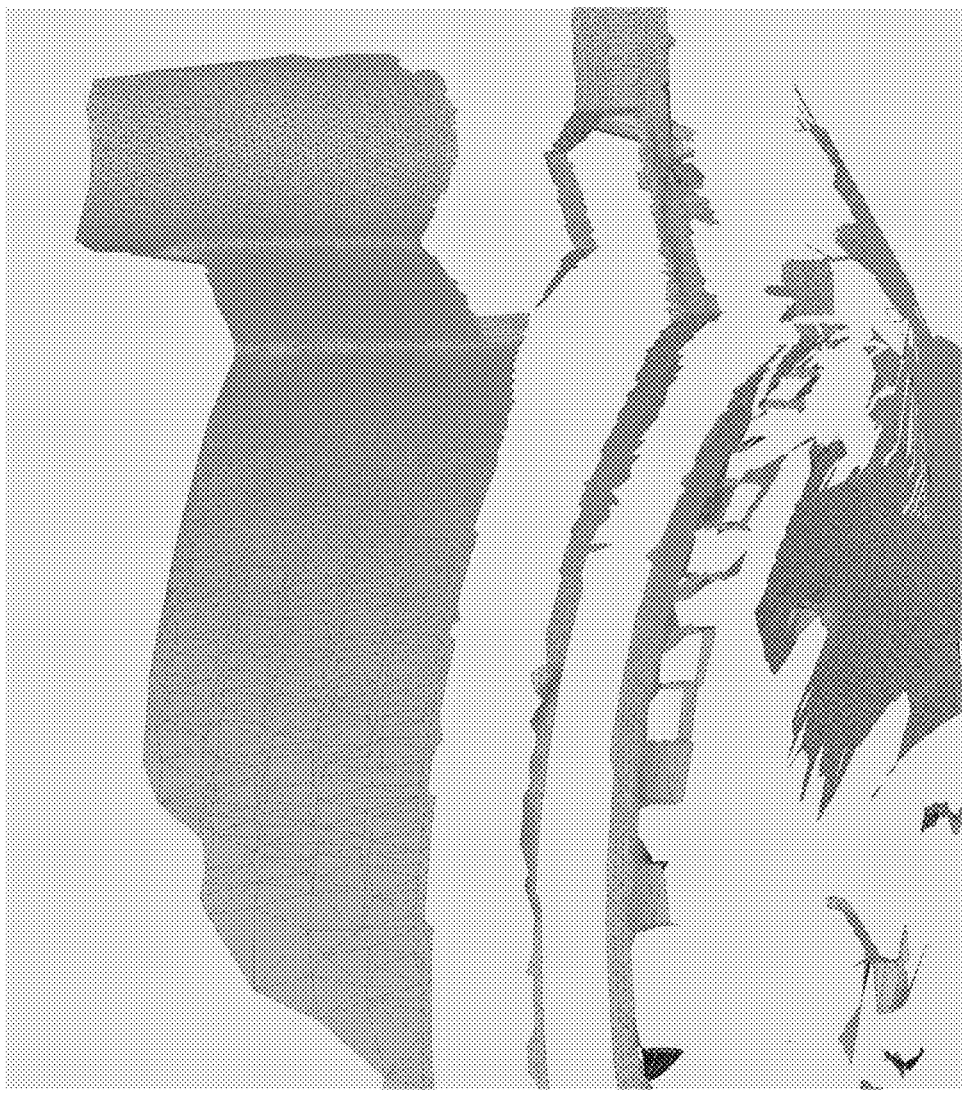
FIG. 10C is a schematic view of a three-dimensional model data of a triangular grid accomplished by the three-dimensional surround scanning device of the present invention.

Referring to FIG. 10B, it is a schematic view of a three-dimensional model data with color information accomplished by the three-dimensional surround scanning device 10. Each point clouds data in FIG. 10A and the two-dimensional image are synchronized to obtain color information of the position pixel for the two-dimensional image corresponding to each point clouds data, and then each point clouds data and the color information are combined to be expressed as a schematic view of the three-dimensional point clouds data with color information, which is another implementing manner of the three-dimensional model data. Referring to FIG. 10C, it is a schematic view of a three-dimensional model data of a triangular grid accomplished by the three-dimensional surround scanning device 10. Each point clouds data in FIG. 10A is projected onto a plane; next, a delauney triangulation is performed on these two-dimensional point data; then, a connection relationship between the points is established; and finally, theses relationships are corresponding back to the original three-dimensional point clouds data, so as to obtain triangular grids, and thus forming a schematic view of the three-dimensional model data of a triangular grid, which is one of the implementing manners of the three-dimensional model data.

Figure 10D:
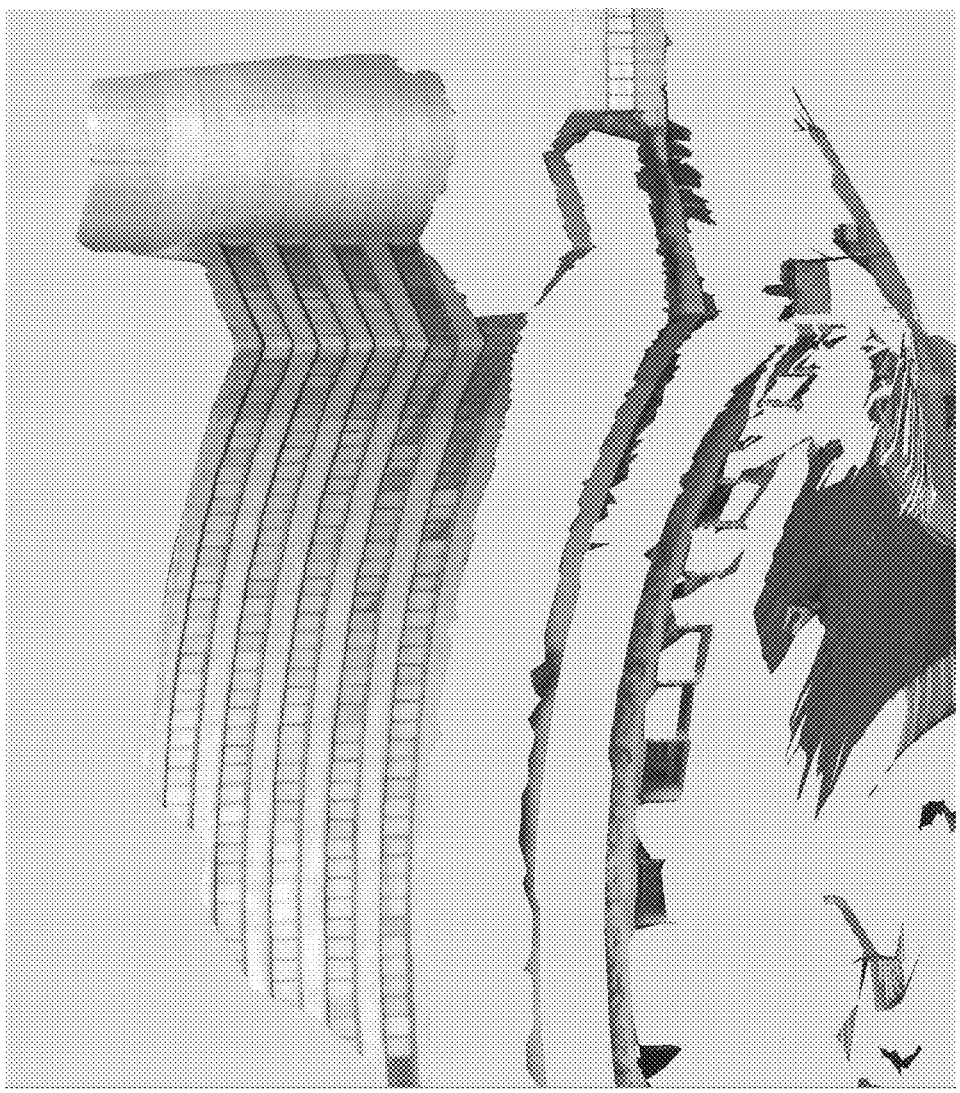
FIG. 10D is a schematic view of a three-dimensional model data with a triangular grid color sub-image accomplished by the three-dimensional surround scanning device of the present invention.

Referring to FIG. 10D, it is a schematic view of a three-dimensional model data with a triangular grid color sub-image accomplished by the three-dimensional surround scanning device 10. The triangular grids and the two-dimensional image in FIG. 10C are both calibrated, to obtain a color picture corresponding to each triangular grid from the two-dimensional image, and then each color picture is adhered to the corresponding triangular grid thereof, so as to form a schematic view of the three-dimensional model data with a triangular grid color sub-image, which is also one of the representation manners of the three-dimensional model data.

[Three-Dimensional Surround Scanning Method]

Figure 11:
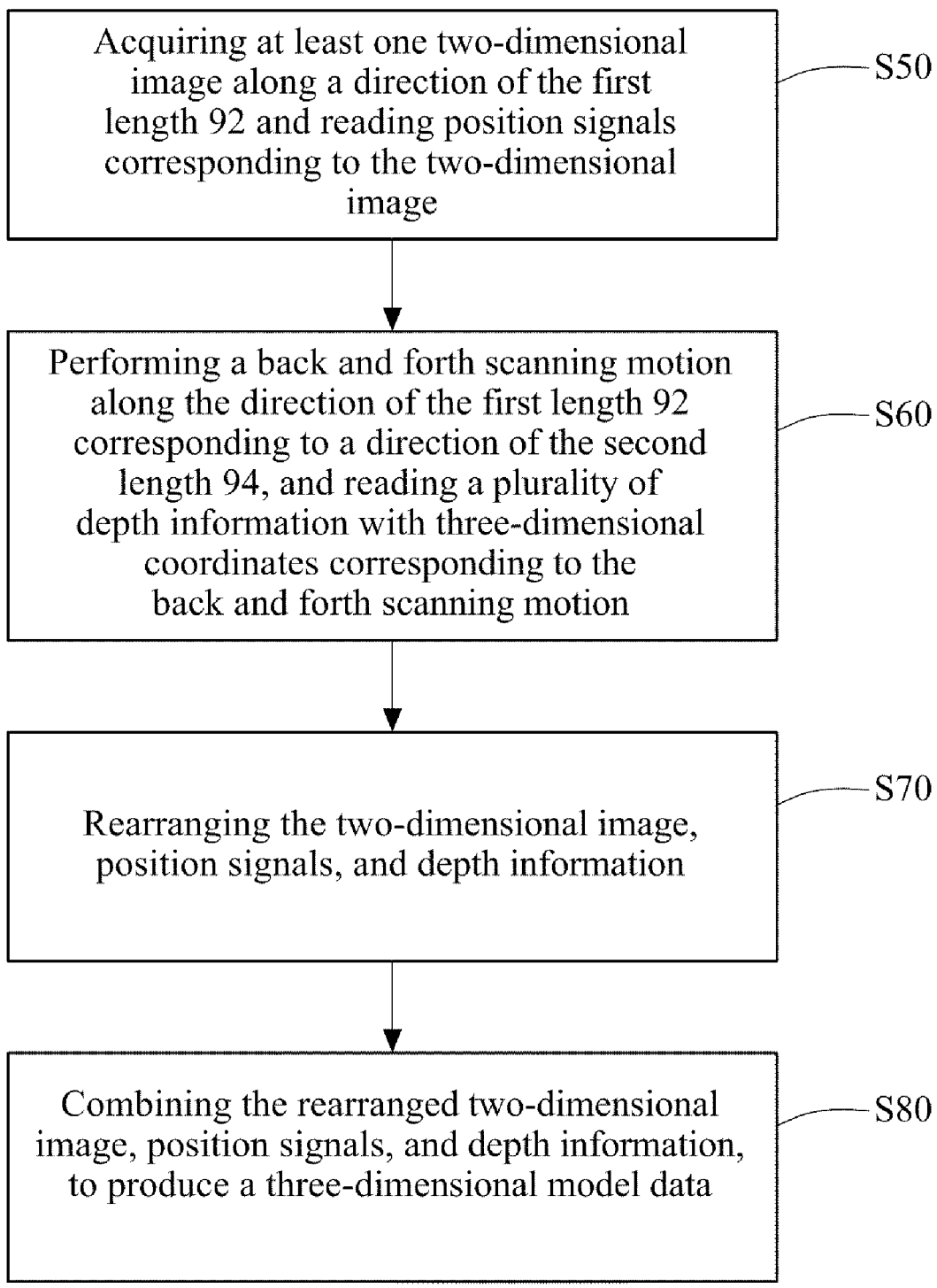
FIG. 11 is a flow chart of a three-dimensional surround scanning method of the present invention.

FIG. 11 shows a three-dimensional surround scanning method of the present invention, in which the three-dimensional surround scanning device 10 is used to perform a three-dimensional surround scanning, for performing a three-dimensional surround scanning on a scene area 90, to construct a three-dimensional model data. The scene area 90 is defined by a first length 92 and a second length 94. The three-dimensional surround scanning method includes the following steps:

S50: acquiring at least one two-dimensional image along a direction of the first length 92 and reading position signals corresponding to the two-dimensional image;

S60: performing a back and forth scanning motion along the direction of the first length 92 corresponding to a direction of the second length 94, and reading at least one depth information with three-dimensional coordinates corresponding to the back and forth scanning motion;

S70: rearranging the two-dimensional image, position signals, and depth information; and S80: combining the rearranged two-dimensional image, position signals, and depth information, to produce a three-dimensional model data.

The method in this embodiment is described below with the scene area 90 and the scanning angles as shown in FIG. 1.

In Step S50, a two-dimensional image of the scene area 90 is acquired along a horizontal direction (the direction of the first length 92) from left to right or from right to left.

In Step S60, a back and forth scanning motion is performed along a vertical axis direction (the direction of the second length 94), and meanwhile, along the horizontal direction (the direction of the first length 92), a depth information is read and a horizontal position and a vertical back and forth position are converted into a coordinate position corresponding to the depth information during the scanning process. In this way, at least one depth information with three-dimensional coordinates may be obtained. The scanning motion in the horizontal direction may be performed from left to right or from right to left.

In Step S70, the following motions are performed on the two-dimensional image, position signals, and depth information with three-dimensional coordinates:

S72: synchronizing the two-dimensional image, position signals, and depth information;

S74: converting the synchronized depth information into a corresponding coordinate position respectively;

S76: converting the synchronized two-dimensional image and position signals into the corresponding coordinate position; and S78: establishing a corresponding relationship between the synchronized two-dimensional image and the depth information corresponding to the coordinate position.

The synchronizing motion, rearranging motion, and the process for producing a three-dimensional model data in the Steps S72, S74, S76, and S78 are the same as that of FIGS. 8A, 8B, 8C, 9A, 9B and 9C, and correspond to the above illustrations for these figures, so which will not be repeatedly described any more.

The coordinate position mentioned in S74 and S76 is a coordinate position corresponding to the scene area 90 obtained through converting the depth information and position signals. As for the two-dimensional image, the same derivation principle is applied to obtain the coordinate position corresponding to each pixel through converting the time, angle (position signals) for shooting (acquiring) the two-dimensional image, and the width of the two-dimensional image, and the like. Of course, the above deformation status of being stretched or compressed due to the lens should be considered as well.

The operation in Step S80 is the same as that of FIGS. 10A, 10B, 10C, and 10D, and corresponds to the above illustrations for the figures. FIG. 10A is generated through the process of "establishing a point clouds data according to the depth information corresponding to the coordinate positions, and producing a three-dimensional model data of the point clouds data". FIG. 10B is accomplished through the step of "adding color information of the two-dimensional image corresponding to the depth information into the point clouds data according to the coordinate position, to produce a three-dimensional model data with color information". FIG. 10C is achieved through the step of "producing the three-dimensional model data of a triangular grid according to the point clouds data". FIG. 10D is accomplished through the process of "producing a three-dimensional model data with a triangular grid color sub-image according to the triangular grid data and the two-dimensional image corresponding to the coordinate position". Since the detailed illustrations may be obtained in the above descriptions about FIGS. 10A, 10B, 10C, and 10D, they will not be repeatedly described any more.

Furthermore, when the system of the present invention is constructed, extrinsic parameter calibration and intrinsic parameter calibration should also be taken into consideration.

The extrinsic parameter calibration includes a calibration of the time delay for transmitting control signals and returning data among the controller 130, the image acquisition element 100, the first moving mechanism 110, and the range acquisition element 120; a calibration of a time delay for the controlled elements (e.g., the image acquisition element 100, the first moving mechanism 110, and the range acquisition element 120) from receiving a control instruction to beginning to operate; and a calibration of an initial state of the controller 130 and that of the controlled elements, and so on. The extrinsic parameter calibration may be achieved by using a standard scene area 90, and particularly, after a simulated measurement, the position of acquisition element 120 and the position of image acquisition element 100 are calibrated. The spatial relationship between the coordinates of the range acquisition element 120 and the image acquisition element 100 is determined and handled according this extrinsic parameter. For example, at a certain time point, the position of the point selected by the range acquisition element 120 exactly corresponds to the pixel in the two-dimensional image of FIGS. 8A, 8B, and 8C. Such corresponding relationship is an extrinsic parameter calibration.

The intrinsic parameter calibration includes a calibration of the two-dimensional image of the lens and the wide-angle lens. The acquired two-dimensional image may have distorted portions with respect to the object in actual space, so the calibration should be performed. Furthermore, the focal lengths of the image acquisition element 100 in the horizontal direction and the vertical direction and other parameters (e.g., original intrinsic parameters of the camera) should also be calibrated. Such calibration belongs to the intrinsic parameter calibration.

What is claimed is:

1. A three-dimensional surround scanning device, adopted to perform a three-dimensional surround scanning on a scene area, for constructing a three-dimensional model data, wherein the scene area is defined by a first length and a second length, the device comprising:
    an image acquisition element, for shooting and returning at least one two-dimensional image when being actuated;
    a first moving mechanism, for carrying the image acquisition element, making the image acquisition element perform a scanning motion along a direction of the first length when being actuated, and returning at least one position signal corresponding to the scanning position;
    a range acquisition element, disposed on the first moving mechanism, for performing back and forth scanning along a direction of the second length when being actuated and returning at least one depth information, wherein when the first moving mechanism and the range acquisition element are both actuated, the range acquisition element performs the back and forth movement along the direction of the first length corresponding to the direction of the second length, and returns the depth information with three-dimensional coordinates; and
    a controller, for actuating the image acquisition element, the first moving mechanism, and the range acquisition element, to control the image acquisition element, the first moving mechanism, and the range acquisition element to respectively return at least one two-dimensional image covering the scene area, the position signals, and the depth information with three-dimensional coordinates, wherein the controller reads and converts the two-dimensional image and the depth information into the three-dimensional model data.

2. The three-dimensional surround scanning device according to claim 1, wherein the two-dimensional image is a two-dimensional image with color information.

3. The three-dimensional surround scanning device according to claim 1, wherein the first moving mechanism is actuated to perform an arc-shaped scanning motion along the direction of the first length.

4. The three-dimensional surround scanning device according to claim 3, wherein the arc shape is a circular arc shape.

5. The three-dimensional surround scanning device according to claim 1, wherein the first moving mechanism comprises:
    a servo motor, for producing a rotation motion when being actuated;
    a position encoder, disposed corresponding to the servo motor, for returning the position signals corresponding to the rotation motion;
    a carrying plate, for carrying the image acquisition element and the range acquisition element; and
    a deceleration gear train, connected to the carrying plate, for receiving the rotation motion to make the carrying plate generate the scanning motion.

6. The three-dimensional surround scanning device according to claim 1, wherein the first length is a width of the scene area, and the second length is a height of the scene area.

7. The three-dimensional surround scanning device according to claim 1, wherein the image acquisition element is a digital camera, a digital video camera, or a digital charged couple device (CCD).

8. The three-dimensional surround scanning device according to claim 1, wherein the range acquisition element comprises:
    a laser range measurement element, for sending a laser pulse, reading a reflected laser pulse, and converting the reflected laser pulse into one depth information;
    a second moving mechanism, for carrying the laser range measurement element, making the laser range measurement element perform back and forth scanning along the direction of the second length when being actuated, and returning the depth information and at least one back and forth scanning position corresponding to each of the depth information; and
    a control unit, for actuating the laser range measurement element and the second moving mechanism, when being actuated by the controller; and integrating the depth information with the back and forth scanning positions, to return the depth information with three-dimensional coordinates.

9. The three-dimensional surround scanning device according to claim 8, wherein the range acquisition element is an imaging device of light detection and ranging (LiDAR).

10. The three-dimensional surround scanning device according to claim 1, wherein the controller is a computer or a server.

11. A three-dimensional surround scanning method, adopted to perform a three-dimensional surround scanning on a scene area, for constructing a three-dimensional model data, wherein the scene area is defined by a first length and a second length, the method comprising:
    acquiring at least one two-dimensional image along a direction of the first length, and reading position signals corresponding to the two-dimensional image;
    performing a back and forth scanning motion along the direction of the first length corresponding to a direction of the second length, and reading at least one depth information with three-dimensional coordinates corresponding to the back and forth scanning motion;

rearranging the two-dimensional image, the position signals, and the depth information; and combining the rearranged two-dimensional image, position signals, and depth information, to produce the three-dimensional model data.

12. The three-dimensional surround scanning method according to claim 11, wherein the rearranging step comprises:

synchronizing the two-dimensional image, the position signals, and the depth information;

converting the synchronized depth information into a corresponding coordinate position respectively;

converting the synchronized two-dimensional image and position signals into the corresponding coordinate position; and establishing a corresponding relationship between the synchronized two-dimensional image and the depth information corresponding to the coordinate position.

13. The three-dimensional surround scanning method according to claim 11, wherein the combining step comprises:

establishing a point clouds data according to the depth information corresponding to the coordinate positions, and producing a three-dimensional model data of the point clouds data.

14. The three-dimensional surround scanning method according to claim 13, after the step of producing a three-dimensional model data of the point clouds data, further comprising:

adding color information of the two-dimensional image corresponding to the depth information into the point clouds data according to the coordinate position, to produce a three-dimensional model data with color information.

15. The three-dimensional surround scanning method according to claim 13, after the step of producing a three-dimensional model data of the point clouds data, further comprising:

producing the three-dimensional model data of a triangular grid according to the point clouds data.

16. The three-dimensional surround scanning method according to claim 15, after the step of producing the three-dimensional model data of a triangular grid data, further comprising:

producing a three-dimensional model data with a triangular grid color sub-image according to the triangular grid data and the two-dimensional image corresponding to the coordinate position.

* * * * *